(12) United States Patent
Kraus et al.

(10) Patent No.: US 10,837,570 B2
(45) Date of Patent: Nov. 17, 2020

(54) VALVE FOR CLOSING A FLUID LINE

(71) Applicant: ArianeGroup GmbH, Taufkirchen (DE)

(72) Inventors: Stephan Kraus, Oedheim (DE); Thomas Maier, Lauffen (DE); Markus Wolf, Stuttgart (DE); Georg Schulte, Kochersteinsfeld (DE)

(73) Assignee: ARIANEGROUP GMBH, Taufkirchen (DE)

( * ) Notice: Subject to any disclaimer, the term of this patent is extended or adjusted under 35 U.S.C. 154(b) by 105 days.

(21) Appl. No.: 15/715,690

(22) Filed: Sep. 26, 2017

(65) Prior Publication Data

US 2018/0087686 A1    Mar. 29, 2018

(30) Foreign Application Priority Data

Sep. 28, 2016   (DE) .................. 10 2016 218 684

(51) Int. Cl.
  *F16K 31/00* (2006.01)
  *F16K 17/40* (2006.01)
  (Continued)

(52) U.S. Cl.
  CPC ............ *F16K 31/002* (2013.01); *F03G 7/065* (2013.01); *F16K 13/04* (2013.01); *F16K 17/403* (2013.01);
  (Continued)

(58) Field of Classification Search
  CPC ...... F16K 31/002; F16K 31/025; F16K 31/46; F16K 17/403; F16K 13/04; F16K 27/00;
  (Continued)

(56) References Cited

U.S. PATENT DOCUMENTS

| 466,022 A | 12/1891 | Rice |
|---|---|---|
| 3,974,844 A | 8/1976 | Pimentel |

(Continued)

FOREIGN PATENT DOCUMENTS

| DE | 3344704 | 6/1985 |
|---|---|---|
| DE | 3916100 | 11/1990 |

(Continued)

OTHER PUBLICATIONS

European Search Report, dated Sep. 12, 2018.
(Continued)

*Primary Examiner* — Craig J Price
*Assistant Examiner* — Andrew J Rost
(74) *Attorney, Agent, or Firm* — Greer, Burns & Crain, Ltd.

(57) ABSTRACT

A valve for closing a fluid line, comprising: an inlet element with an inlet line; an outlet element with an outlet line; a closing element which, in a first state, allows a fluid passage between the inlet line and the outlet line and which, in a second state, closes the fluid passage, wherein the closing element, in the first state, is fixedly connected to the inlet element or the outlet element and, in the second state, is detached from the inlet element or the outlet element; an actuator which, when actuated, is configured to move the closing element from the first state towards the second state; and a pretension element which is pretensioned and is configured to move the closing element into the second state after actuation of the actuator.

11 Claims, 1 Drawing Sheet

(51) Int. Cl.
*F16K 31/02* (2006.01)
*F03G 7/06* (2006.01)
*F16K 27/00* (2006.01)
*F16K 49/00* (2006.01)

(52) U.S. Cl.
CPC ............ *F16K 27/00* (2013.01); *F16K 31/025* (2013.01); *F16K 49/002* (2013.01)

(58) Field of Classification Search
CPC ........ F16K 49/002; F16K 17/40; F16K 17/14; F03G 7/065; F02K 9/00; Y10T 137/8811; Y10T 137/1632; Y10T 137/1639
USPC .......... 137/457, 468, 72, 75, 76, 797, 68.11, 137/68.12; 251/66–74, 63.4, 49
See application file for complete search history.

(56) References Cited

U.S. PATENT DOCUMENTS

| | | | |
|---|---|---|---|
| 4,625,762 A * | 12/1986 | Hassanzadeh | E21B 21/10 137/624.27 |
| 4,973,024 A | 11/1990 | Homma | |
| 5,730,169 A | 3/1998 | Adams | |
| 8,499,779 B2 | 7/2013 | Gillespie | |
| 9,611,838 B2 * | 4/2017 | Koehler | F03G 7/065 |
| 9,677,681 B1 * | 6/2017 | Ramspacher | F16K 31/025 |
| 2004/0087802 A1 | 5/2004 | Furukawa et al. | |
| 2005/0173661 A1 | 8/2005 | Mignon et al. | |
| 2010/0078081 A1 * | 4/2010 | McKee | F16K 31/002 137/468 |
| 2012/0104292 A1 | 5/2012 | Kollar et al. | |
| 2013/0167377 A1 | 7/2013 | Gillespie | |
| 2015/0028234 A1 | 1/2015 | Kraus et al. | |
| 2015/0252794 A1 | 9/2015 | Kraus | |
| 2015/0260300 A1 | 9/2015 | Wolf et al. | |
| 2015/0316164 A1 | 11/2015 | Sohn | |
| 2017/0248246 A1 | 8/2017 | Valentin | |

FOREIGN PATENT DOCUMENTS

| | | |
|---|---|---|
| DE | 102011054458 | 5/2012 |
| DE | 202012104460 | 2/2014 |
| DE | 102014002972 | 9/2015 |
| EP | 1548342 A1 | 6/2005 |
| JP | 200992130 | 8/2009 |
| WO | 2016035067 A1 | 3/2016 |

OTHER PUBLICATIONS

German Search Report, dated Jun. 30, 2017, priority document.
European Examination Report for corresponding European Patent Application No. 17190457.6 dated Apr. 17, 2019.

* cited by examiner

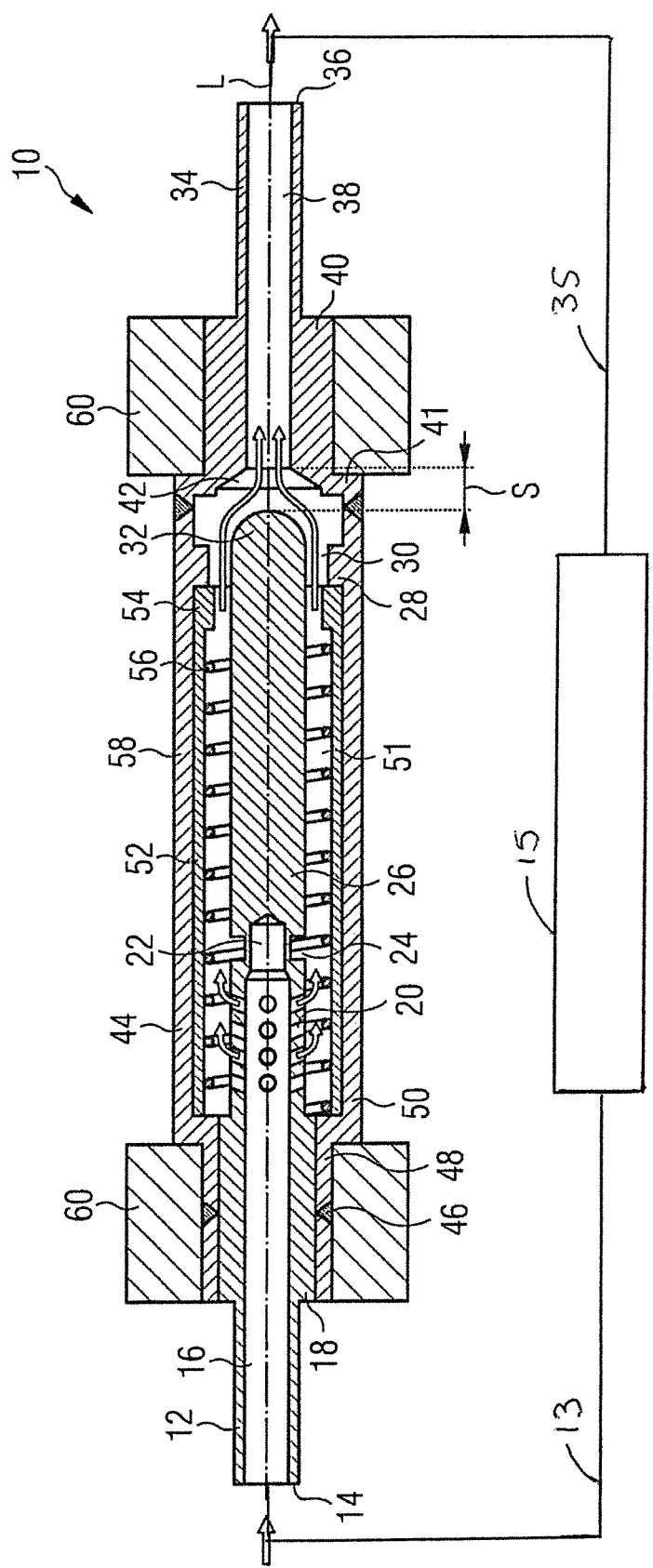

VALVE FOR CLOSING A FLUID LINE

CROSS-REFERENCES TO RELATED APPLICATIONS

This application claims the benefit of the German patent application No. 10 2016 218 684.1 filed on Sep. 28, 2016, the entire disclosures of which are incorporated herein by way of reference.

BACKGROUND OF THE INVENTION

The invention relates to a valve for closing a fluid line and to a spacecraft drive system comprising such a valve.

In spacecraft and satellites, it is known to provide valves which are closable and in particular can be closed one time only, that is to say irreversibly.

From DE 10 2014 002 972 A1 there is known a valve which comprises a shape-memory material which expands when it reaches a phase transition temperature and thereby closes a fluid passage.

From US 2013/0167377 A1 there is known a valve arrangement for a spacecraft component for one-time actuation, which valve arrangement comprises an inlet and an outlet and also an actuator which is actuatable by a heating element. In an actuated state of the actuator, flow between the inlet and the outlet is possible (normally-closed valve arrangement). The actuator comprises a shape-memory material which extends in the martensitic state along a longitudinal axis of the actuator and into which the valve arrangement is integrated. By activating the heating element, it experiences a change in length on reaching a predetermined transformation temperature, by means of which a valve piston can gradually be removed from the seal seat formed at the inlet or the outlet.

U.S. Pat. No. 3,974,844 A discloses a reversibly actuatable normally-open valve arrangement for household appliances having an inlet and an outlet and also an actuator actuatable by a heating element. The actuator is a one-way shape-memory actuator which is integrated into the valve arrangement and which, through activation of the heating element, experiences a change in length on reaching a predetermined transformation temperature, by means of which it can gradually be pressed against a seal seat and removed therefrom.

U.S. Pat. No. 4,973,024 A discloses a further reversibly actuatable normally-closed valve arrangement which comprises an inlet and an outlet and also an actuator actuatable by a heating element.

DE 20 2012 104 460 U1 discloses a reversibly actuatable normally-open valve arrangement having an inlet and an outlet and also an actuator which is actuatable by a heating element and which acts against a return element.

DE 10 2011 054 458 A1 discloses a reversibly actuatable normally-open valve arrangement for high-volt battery applications having an inlet and an outlet and also an actuator actuatable by a heating element.

JP 2009 092130 A discloses a further valve arrangement having an inlet and an outlet and also an actuator actuatable by a heating element.

SUMMARY OF THE INVENTION

An object underlying the invention is to provide a valve for closing a fluid line, which valve has reliable tightness while having a simplified construction.

A valve for closing a fluid line has the following: an inlet element with an inlet line; an outlet element with an outlet line; a closing element which in a first state allows a fluid passage between the inlet line and the outlet line and which in a second state closes the fluid passage, wherein the closing element in the first state is fixedly connected to the inlet element or the outlet element and in the second state is removed from the inlet element or the outlet element; an actuator which, when actuated, is configured to move the closing element from the first state towards the second state; and a pretension element which is pretensioned and is configured to move the closing element into the second state after actuation of the actuator. The pretension element may be chosen to be so strong that the closing element experiences plastic deformation in the second state, which results in high fluid tightness, in particular high gas tightness. This solution is distinguished by an almost unlimited lifetime, low production costs and high internal (helium) tightness.

The actuator may have thermal expansion behavior which differs from that of the inlet element or the outlet element. In addition, the thermal expansion behavior of the actuator may differ from that of the closing element and/or of the inlet element or of the outlet element and also of all other components of the valve. Preferably, the actuator expands to a greater extent than the other component(s). As a result, the degree of bearing against the closing element and the forces transmitted thereby can be increased as the heating increases, in particular if the closing element impedes expansion of the actuator. In other words, it may be provided that the actuator is designed to exert compressive forces on the closing element according to a level of heating.

The bearing of the actuator may take place indirectly, for example via intermediate elements, or directly, for example by direct abutment on the closing element. It will be noted that the actuator, in particular at a low level of heating or a low temperature, may not at first bear against the closing element and/or rest directly thereon. Instead, this may take place only after a certain level of heating or a certain temperature has been reached and, for example, at the latest, when a predetermined level of heating has been reached, which will be discussed hereinbelow. In other words, a gap may initially be provided between the actuator and the closing element, which gap may, in particular, compensate for different thermal expansion behavior of those elements, as long as the predetermined level of heating has not been reached.

It may further be provided that the actuator extends along a longitudinal axis of the inlet element or of the outlet element. To this end, the actuator may be formed substantially corresponding to the inlet element or the outlet element and/or arranged inside the valve, so that those elements are able to extend substantially parallel to one another inside the valve. For example, the actuator may extend along a longitudinal axis and be of generally elongate form, it being possible for the longitudinal axes of the actuator and of the inlet element or of the outlet element to extend parallel to one another or also to coincide.

Finally, the actuator may be designed to bear against the closing element, once a predetermined level of heating has been reached, with such a force that the closing element is moved from its starting position.

The predetermined level of heating may be understood as being, in particular, a temperature increase of the actuator to a predetermined temperature threshold. It may likewise include maintaining the actuator at or above the corresponding temperature threshold for a specific minimum period of time. The bearing force of the actuator may exceed a weight force of the closing element and/or a fixing or pretensioning force which initially holds the closing element in its starting position. In particular, the actuator may be designed to move the closing element substantially along a longitudinal axis of the inlet element or of the outlet element and/or towards the inlet element and/or the outlet element. In addition or alternatively, it may be provided that the movement takes place along the inlet and/or outlet line. Furthermore, the closing element, in its end position moved from the starting position, may generally be arranged between the inlet element and the outlet element, thus allowing the fluid that is to be conducted to flow around or through it.

The provision of such a valve permits reliable actuation and simplified sealing with a compact construction. In particular, the relevant elements may extend substantially parallel to one another or along common longitudinal axes, and an actuating movement can also take place along that longitudinal axis. Overall, the valve may thus be generally elongate in form and have reduced cross-sectional dimensions compared with prior-known solutions. In particular, the valve dimensions extending transversely to a fluid line through the valve can be reduced considerably.

The actuator may comprise a hollow cylindrical portion which encloses at least a portion of the inlet element or the outlet element. The enclosing of at least a portion may be provided along the longitudinal axis of the inlet element or of the outlet element and/or along a peripheral axis. However, the actuator preferably extends at least along a certain portion of the longitudinal axis of the inlet element or of the outlet element and thereby receives it in the hollow cylindrical portion. At least the hollow cylindrical portion of the actuator may be formed generally corresponding to the inlet element or to the outlet element, for example with a corresponding cross-sectional shape. Furthermore, the hollow cylindrical portion may rest on an outer peripheral surface of the inlet element or of the outlet element and/or at least a portion thereof may be arranged at a distance therefrom, so that there is a gap between an inner peripheral surface of the actuator and an outer peripheral surface of the inlet element or of the outlet element. At a higher level, the hollow cylindrical portion may accordingly be tubular or sleeve-shaped, preferably with a round and/or circular cross-section, and the actuator can, as it were, be pushed onto the inlet element or the outlet element.

According to a further aspect, the actuator, at the latest when the predetermined level of heating is reached, may be displaceable, at least in part, relative to the inlet element or the outlet element and, in particular, may be displaceable along the longitudinal axis of the inlet element or of the outlet element. The relative displaceability can be attributable in particular, to an increasing thermal expansion of the actuator relative to the inlet or outlet element, which remains constant or expands only slightly. In particular, it may be provided that the inlet element and/or the outlet element is/are generally stationary inside the valve and the actuator moves relative thereto according to the level of heating. The actuator may generally become longer, so that, in particular, an axial end of the actuator facing the outlet region is able to move relative to and/or along the inlet element or the outlet element.

It may further be provided that the actuator, at the latest when the predetermined level of heating is reached, has at least one dimension which is increased compared with a state of the actuator below the predetermined level of heating. For example, the actuator may become longer and/or change its cross-sectional dimensions in dependence on the level of heating. This may be, in particular, a lengthening along a longitudinal axis of the actuator and/or of the inlet element and/or of the outlet element.

According to a preferred variant, the actuator comprises a shape-memory material. Such materials are known in the prior art, for example in the form of so-called shape-memory alloys (in particular nickel-titanium alloys). The shape-memory material may further be heat- or temperature-activatable. In other words, the shape-memory material, according to a level of heating of the actuator, can return to an original starting shape which is preferably distinguished as outlined above by increased dimensions and/or increased bearing forces against the coupling element.

In this connection, the shape-memory material may be pseudoplastically deformed and begin to return to its original shape at the latest when the predetermined level of heating is reached. The pseudoplastic deformation may include compression of the actuator and occurs preferably with the exertion of compressive forces on the actuator.

Accordingly, the actuator may initially be arranged in a (pseudoplastically) deformed state in the valve, it being possible for the actuator in this state further to have reduced dimensions (for example, a reduced length due to compression/compressive forces). The material microstructure of the shape-memory material can thereby be de-twinned in a known manner in order to provide the shape-memory effect. The pseudoplastic deformation may further initially persist in the absence of heat or with only slight heating. According to a level of heating of the actuator, and, in particular, when an activation temperature or an activation heating level is reached, the pseudoplastic deformation may then be reversed, so that the actuator returns to its original shape. As outlined, this may include, in particular, a return to a non-compressed state, that is to say, for example, a corresponding increase and/or lengthening of the actuator. This can result overall in the greater thermal expansion of the actuator compared with the inlet element, as outlined above, and lead to increased bearing forces against the closing element.

In its starting position, the closing element may be connected to the inlet element or the outlet element by a material-bonded connection. In this case too, arrangement on an, in particular, material-bonded connection directly with an axial end of the inlet element or of the outlet element preferably facing the inlet element or the outlet element may be provided. The material-bonded connection may be provided by welding, adhesive bonding, soldering, formation in one piece or the like, whereby the material-bonded connection can generally be encompassed by a connecting portion between the inlet element or the outlet element and the closing element.

It may further be provided in this connection that a connecting portion between the inlet element or the outlet element and the closing element includes a mechanically weakened region which forms a predetermined breaking point. Mechanical weakening can be understood as meaning, in particular, a reduced force transmission capacity, or a reduced breaking point compared with adjacent regions of the inlet element or of the outlet element or of the connecting portion. This can generally be effected by varying the material properties in the region of the predetermined breaking point, for example, by choosing different materials within the inlet or outlet element. Likewise, the stiffness in the region of the predetermined breaking point can be reduced, for example, by varying the cross-sectional dimensions. According to a preferred variant, the predetermined breaking point comprises a notch in the form of a locally reduced cross-section and, in particular, in the form of a locally reduced diameter in the case of a cylindrical (and/or tubular) form of the inlet or outlet element. The closing element may, accordingly, be in the form of a separable notched tube head. Accordingly, it may be provided that the actuator is designed to bear against the closing element, when the predetermined level of heating is reached, with a force such that the predetermined breaking point breaks and a movement of the closing element from its starting position is thus made possible.

The closing element may comprise at least one force transmission region against which the actuator is able to bear at the latest when the predetermined level of heating has been reached. The force transmission region may comprise, for example, a portion of the closing element having enlarged cross-sectional and, in particular, diameter dimensions, which preferably protrude beyond a diameter of the inlet or outlet element. The force transmission region may further lie opposite an axial end or an axial end face of the actuator (in particular, when viewed along the longitudinal axis), so that the actuator, when heated, is able to expand towards the force transmission region and/or rest thereon with increasing bearing forces.

The pretension element may bear against the closing element and may be designed to displace the closing element from its starting position/first state at the latest when the predetermined level of heating is reached. The pretension element may be accommodated in the valve with a suitable pretension and bear against the closing element, in particular, by means of a compressive force. In a preferred variant, the pretension device likewise extends along a longitudinal axis of the inlet or outlet element. In addition, it may thereby be arranged in a gap between the actuator and the inlet element and/or likewise bear against a possible force transmission region of the closing element. Finally, the pretension element may generally be in the form of a spiral spring, preferably a coil spring, and receive at least a portion of the inlet or outlet element or extend in the form of a spiral around the inlet or outlet element.

The provision of a pretension element is advantageous, in particular, for variants in which a predetermined breaking point must first be broken by means of the actuator, and the pretension element is then to ensure a sufficient movement of the closing element from its starting position (for example, complete lifting from an axial end of the inlet element). To this end, the pretension element may further be designed also to move the closing element sufficiently far that it is lifted from the actuator, which may be becoming longer. The pretension element may be designed to displace the closing element (for example, in the form of the separated notched tube head) as far as a predetermined stop. The stop may be provided in a connecting element, on a connecting element wall of the valve or on the inlet or outlet element as a seal seat. Furthermore, the closing element, when displaced by the pretension element, may generally bear against the connecting element and in particular against a connecting element inside wall or can slide directly thereon.

The actuator and the pretension element may be connected in parallel. As a result, a compact, space-saving valve can be provided, and the force for closing the valve can be increased compared with a series connection.

Alternatively or in addition, the pretension element may be arranged at least partly inside the actuator or the actuator may be arranged at least partly inside the pretension element, which not only makes the valve more compact, but also effects mutual guiding of the pretension element and the actuator, so that their force development is directed.

The inlet element may have at least one radial bore which connects the inlet line with an exterior of the inlet element, the at least one radial bore preferably having a smaller diameter than the inlet line. Such a radial bore can improve the compactness of the valve.

The at least one radial bore may lead into a fluid passage chamber which connects the inlet line and the outlet line in a fluid-conducting manner.

Likewise, a connecting element can connect the inlet element and the outlet element in a fluid-conducting manner and define together with the inlet element and the outlet element the fluid passage chamber. In this manner, mounting of the valve components, in particular, of the pretension element and/or of the actuator, can be facilitated and a material that is different from the material of the inlet and outlet element and/or a material thickness that is different from the material thickness of the inlet and outlet element can be chosen for the connecting element. Such a connecting element preferably has different heat-conducting properties than the inlet or outlet element, preferably higher heat-conducting properties. As a result, the actuator can be actuated early or actuated prior to thermal expansion of the inlet or outlet element. Preferably, the connecting element is made of a NiCr or Ti alloy.

The connecting element may be substantially cylindrical and preferably elongate in shape, and may also be in one piece or composed of a plurality of individual components. In particular, the connecting element may be tubular or sleeve-shaped and may have a coupling region for the inlet element and also for the outlet element. The connecting element may further extend along a longitudinal axis which may extend parallel to the longitudinal axes of the inlet element and/or of the actuator and preferably coincides therewith.

In one variant, at least the inlet element is welded to the connecting element. In addition or alternatively, any outlet element may also be welded to the connecting element. The actuator and also the closing element may thereby be arranged inside the connecting element and enclosed thereby in a fluidically sealing manner. The welded connections can further ensure sufficient sealing of the valve, and the inlet and outlet element and preferably also the connecting element can be hollow cylindrical or substantially tubular. On account of this welding, a particularly tight valve is provided (external tightness).

In principle, it is conceivable that the heating of the actuator takes place without the purposive or artificially generated supply of heat but occurs automatically as a result of a general heating of the drive system upon atmospheric re-entry. For example, it is known that considerable frictional heat which generally heats a satellite, for example, and the components thereof is generated upon atmospheric re-entry due to aerothermodynamic effects.

In addition, a heating element may be thermally connected to the actuator, which comprises a shape-memory material, the inlet element and/or the outlet element being thermally decoupled from the heating element by means of a thermal decoupling element, whereby a short release time/closing time of the valve can be achieved. The heating element may be adhesively bonded, preferably to the connecting element. The decoupling element may be made of a silicone, an elastomer or an oxide ceramic material as well as a combination of these materials.

The closing element may likewise be a cylindrical body which extends in the longitudinal direction of the valve and is guided predominantly inside the pretension element. The mass of the closing element can thereby be increased, and the closing element can serve as a guide for the pretension element and/or the actuator.

It is also possible that the closing element in the second state is pressed into a seal seat, the closing element and/or the seal seat being provided with a soft metal coating, preferably a galvanic deposition of gold, whereby the forces required to achieve permanent sealing can be reduced. The above-described higher mass of the closing element on account of its direction of extension in the longitudinal direction of the valve leads to a higher mass moment of inertia, which results in higher plastic deformation of the closing element at the seal seat.

The invention relates further to a spacecraft drive system, in particular, a satellite drive system, comprising one of the above valves.

BRIEF DESCRIPTION OF THE DRAWINGS

Preferred embodiments of the invention are explained in greater detail in the following by means of the accompanying drawing, in which The FIG. is a longitudinal section of a valve according to an exemplary embodiment which is in an open starting state.

DETAILED DESCRIPTION OF THE PREFERRED EMBODIMENTS

The FIG. shows a valve according to an exemplary embodiment, which valve is generally designated 10.

The construction of the valve 10 will be described first, followed by its mode of operation.

The valve 10 has a generally cylindrical shape and extends symmetrically along a longitudinal axis L, which coincides with the longitudinal axes of all the following valve components.

The valve 10 has a tubular inlet element 12 which can be coupled with a fluid line 13, for example, of a spacecraft drive system 15, in particular, of a satellite drive system. Starting from such an end 14 suitable for coupling with a fluid line, the inlet element 12 extends in tubular form along the longitudinal axis L with an inlet line 16 in the form of a bore 16 of constant diameter. Along this bore 16 the cylindrical inlet element 12 has, in the longitudinal direction, a mounting portion 18 in the form of a cylindrical projection, which will be explained in greater detail hereinbelow, and, following this mounting portion 18, radially extending through-bores 20 through the inlet element 12, which connect the bore 16, that is to say the interior of the inlet element 12, with the exterior of the inlet element 12 in a fluid-permeable manner.

The through-bores 20 here extend equidistantly along a plane through the inlet element 12 and through the longitudinal axis L, in each case two groups of four such through-bores 20 being arranged perpendicularly to one another. In addition, the through-bores 20 are inclined in their extension direction from the bore 16 outwards in the opposite direction to the end 14 of the inlet element 12. Following the through-bores 20, the bore 16 ends as a blind bore 22 of smaller diameter.

In a middle region of the blind bore 22 along the longitudinal axis L, the wall thickness of the inlet element 12 is reduced to a minimum along the inlet element 12 by means of a notch 24 running radially outside the inlet element 12. This notch 24 constitutes a predetermined breaking point. The blind bore 22 is followed by a closing element 26 in the form of a solid cylinder, which extends in the form of a cylinder over two thirds of its length along the longitudinal axis L and in its final third widens radially annularly to a line portion 28 with through-bores 30 extending parallel to the longitudinal axis L, in order subsequently, from the same outside diameter as the first two thirds of the closing element 26, to terminate as a dome-shaped sealing piston 32.

The valve 10 additionally has an outlet element 34 which, like the inlet element 12, can be coupled with a fluid line 35, for example, of the spacecraft drive system 15, in particular, of a satellite drive system. Starting from such an end 36 suitable for coupling with a fluid line, the outlet element 34 extends in tubular form along the longitudinal axis L with an outlet line 38 in the form of a bore 38 of constant diameter. The outlet element 34 is here in the form of a hollow cylinder with multiple steps, a first cylindrical projection 40 spaced apart from the end 36 merging into a second projection 41. Within the second projection 41, the bore 38 widens at the end of the outlet element 34 facing the closing element 26 to form a cone-shaped seal seat 42.

The sealing piston 32 and/or seal seat 42 are provided with a soft metal coating, preferably a galvanic deposition of gold.

A connecting element 44 of a NiCr or Ti alloy in the form of a valve housing 44 connects the inlet element 12 and the outlet element 34 by means of, in each case, a peripheral weld seam 46 in such a manner that the sealing piston 32 and the seal seat 42 are spaced apart from one another along the longitudinal axis L by a distance S in an unactuated starting state of the valve. The connecting element 44 is a stepped hollow cylinder, wherein a first region 48 of smaller inside diameter can be pushed onto the mounting portion 18 of the inlet element 12 and a second region 50 of larger inside diameter can be pushed onto the second projection 41 of the outlet element 41 in an abutting manner and flush therewith. The second region 50 has a larger inside diameter than the outside diameter of the inlet element 12 at the level of the through-bores 20 so that a fluid passage chamber 51 is present inside the connecting element 44 between the inlet element 12 and the outlet element 34.

An actuator 52 extends in the form of a hollow cylinder along the inside wall of the connecting element 44 between the first region 48 and the line portion 28. At its end 54 facing the line portion 28, the actuator 52 is stepped radially inwards in the form of a cylinder at a distance from the closing element 26. The actuator 52 is a shape-memory actuator 52 which is compressed before being fitted into the connecting element 44, so that it does not expand until it reaches a phase transition temperature.

A pretensioned pretension element in the form of a coil spring 56 extends along the inside wall of the actuator 52 between the first region 48 and the stepped end 54 of the actuator 52.

An electric heating element 58 is adhesively bonded to the outer lateral surface of the connecting element 44. The heating element 58 extends along the longitudinal axis L in a hollow cylindrical manner concentrically with the actuator 52, so that it surrounds a large proportion of the actuator 52. The shortest distance of the heating element 58 from the inlet element 12 and the outlet element 34 is thereby always greater than the shortest distance of the heating element 58 from the actuator 52.

Thermal decoupling elements 60 are located on the outer lateral surface of the first region 48 of the connecting element 44 and on the outer lateral surface of the first projection 40 of the outlet element 34. The decoupling elements 60 can be made of silicone, an elastomer or an oxide ceramic material, as well as a combination of these materials.

The mode of operation of the valve 10 will now be described.

In the first state of the valve 10 shown in the FIG., a fluid line is open. The arrows show the flow of fluid through the inlet line 16, the through-bores 20 of the inlet element 12, the fluid passage 51, the interior of the stepped end 54 of the actuator 52, the through-bores 30 of the line portion 28 and the outlet line 38.

In a second state (not shown) of the valve 10, the actuator 52 has expanded after reaching a phase transition temperature due to the action of heat from the heating element 58 and, together with the pretension element 56, has reached a breaking force limit, which has led to the closing element 26 breaking away from the inlet element 12 at the notch 24. The pretension element 56 has then pressed the broken-off closing element 26 with its sealing piston 32 into the seal seat 42, in which the pretension element 56 also continues to reliably hold the sealing piston 32. In this second state, the fluid line is thus separated in a fluid-tight manner at the point between the through-bores 30 of the line portion 28 and the outlet line 38. As a result of the operation of breaking the closing element 26 away from the inlet element 12, this state is irreversible, that is to say the valve 10 can be closed one time only.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A valve for closing a fluid line, comprising:
   an inlet element with an inlet line;
   an outlet element with an outlet line;
   a closer which, in a first state, allows a fluid passage between the inlet line and the outlet line and which, in a second state, closes the fluid passage, wherein the closer in the first state is fixedly connected to the inlet element or the outlet element and in the second state is detached from the inlet element or the outlet element;
   an actuator, including a wall defining an enclosure, which, when actuated, is configured to move the closer from the first state towards the second state; and
   a pretension element which is pretensioned and is configured to move the closer into the second state after actuation of the actuator,
   wherein the actuator and the pretension element are connected in parallel, such that a force of the actuator when actuated adds up with a force of the pretension element, and
   wherein the pretension element extends along the wall of the actuator.

2. The valve as claimed in claim 1, wherein the pretension element is arranged at least partly inside the actuator.

3. The valve as claimed in claim 1, wherein the inlet element has at least one radial bore which connects the inlet line with an exterior of the inlet element.

4. The valve as claimed in claim 3, wherein the at least one radial bore leads into a fluid passage chamber which connects the inlet line and the outlet line in a fluid-conducting manner.

5. The valve as claimed in claim 4, wherein a connecting element connects the inlet element and the outlet element in a fluid-conducting manner and together with the inlet element and the outlet element defines the fluid passage chamber.

6. The valve as claimed in claim 1, wherein a heater is thermally connected to the actuator, which comprises a shape-memory material, and at least one of the at least the inlet element or the outlet element is thermally decoupled from the heater by means of a thermal decoupler.

7. The valve as claimed in claim 1, wherein the closing closer is a cylindrical body which extends in the longitudinal direction of the valve and is guided predominantly inside the pretension element.

8. The valve as claimed in claim 1, wherein the closer in the second state is pressed into a seal seat, at least one of the closer and the seal seat being provided with a soft metal coating.

9. The valve as claimed in claim 1, wherein the pretension element extends along an interior surface of the actuator wall.

10. A spacecraft drive system comprising a valve as claimed in claim 1.

11. The spacecraft drive system of claim 10, comprising a satellite drive system.

* * * * *